United States Patent [19]

Hart et al.

[11] 4,261,934
[45] Apr. 14, 1981

[54] METHOD FOR HOMOGENIZING MIXED OXIDE NUCLEAR FUELS

[75] Inventors: Patrick E. Hart; Jack L. Daniel; Daniel W. Brite, all of Richland, Wash.

[73] Assignee: Electric Power Research Institute, Inc., Palo Alto, Calif.

[21] Appl. No.: 965,144

[22] Filed: Nov. 30, 1978

[51] Int. Cl.² ............................................. G21C 21/00
[52] U.S. Cl. .................................................... 264/0.5
[58] Field of Search ......................................... 264/0.5

[56] References Cited

U.S. PATENT DOCUMENTS

| | | | |
|---|---|---|---|
| 3,689,428 | 9/1972 | Pechin et al. | 264/0.5 |
| 3,995,000 | 11/1976 | Butler et al. | 264/0.5 X |

OTHER PUBLICATIONS

"The Homogenization of $ThO_2$-$UO_2$" (LWBR Development Program) by R. M. Berman, AEC Research and Development Report, WAPD-TM-1051, Dec. 1972.

R. Thiesen and D. Vollath, "Plutonium Distribution and Diffusion in $UO_2$-$PuO_2$ Ceramics", Proceedings of Symposium on the Use of Plutonium as a Reactor Fuel, International Atomic Energy Agency, Brussels, Mar. 13-17, 1967. Pub. International Atomic Agency, Vienna, 1967, pp. 253-264.

H. Andriessen et al. "Fabrication de Combustibles a Oxydes Mixtures $UO_2$-$PuO_2$ pour Reacteurs a Neutrons Rapides", ibid, p. 237.

R. E. Woodley, "Variation in the Oxygen Potential of a Mixed-Oxide with Simulated Burnup", Journal of Nuclear Materials 74 (1978) 290-296.

P. E. Hart and D. R. Olander, "Plutonia Particle Behavior during the Sintering of Mixed Oxide Fuels", Journal of Nuclear Materials 78 (1978) 315-325.

Primary Examiner—Leland A. Sebastian
Attorney, Agent, or Firm—Flehr, Hohbach, Test

[57] ABSTRACT

A method for homogenizing plutonia particles in mixed oxide nuclear reactor fuels. The method includes the step of blending urania particles and plutonia particles together and pressing the mixture into a pellet. The pellet is thereafter sintered in a reducing atmosphere with hydrogen present so that pores are formed in the pellet. The plutonia particles are thereby transformed into spherical shells of dense $PuO_{2-x}$ that surround each pore and which homogenizes the fuel.

7 Claims, 10 Drawing Figures

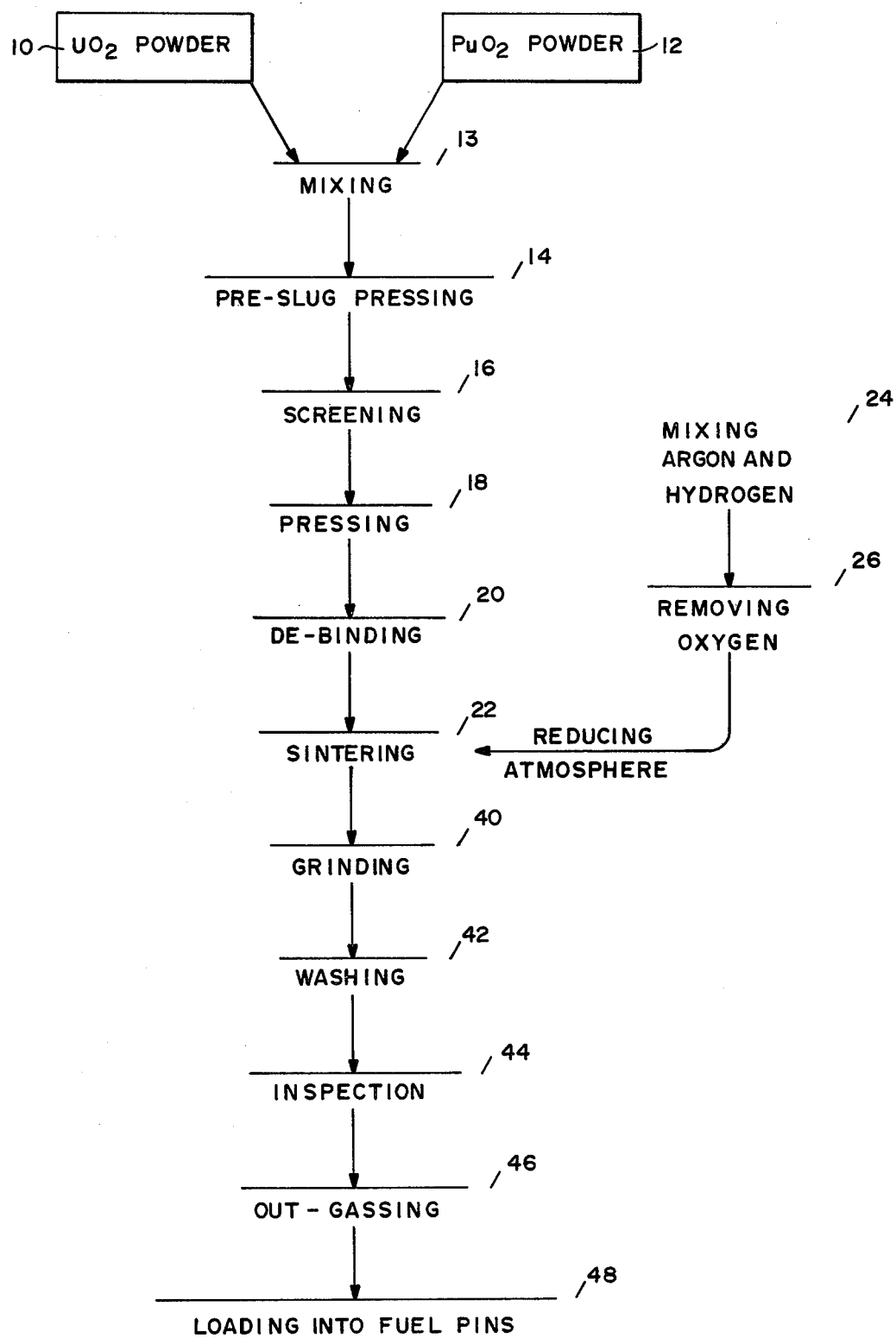
FIG. — 1

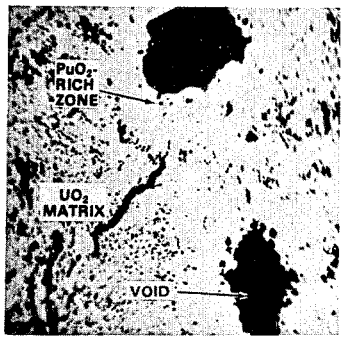
FIG.—2A
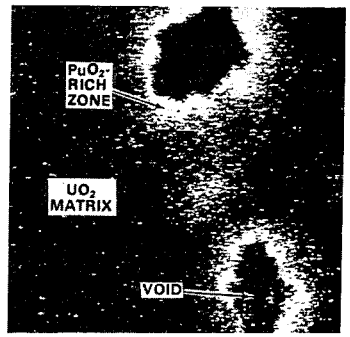
FIG.—2B
TYPE 1 FUEL
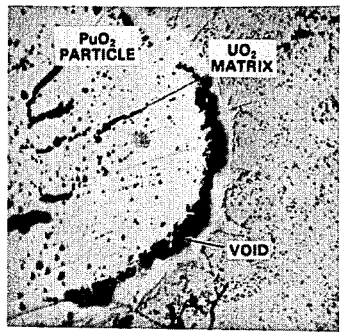
FIG.—3A
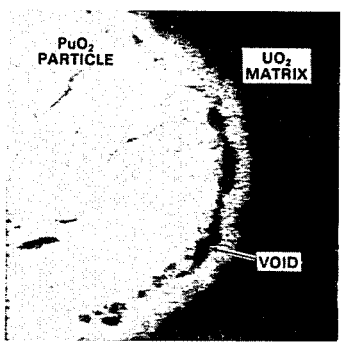
FIG.—3B
TYPE 2 FUEL
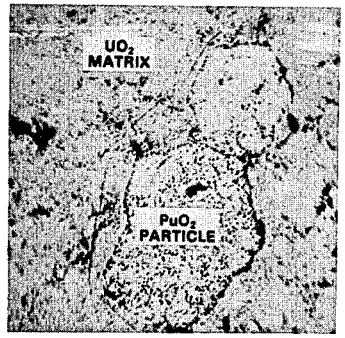
FIG.—4A
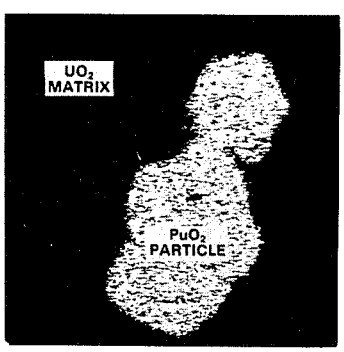
FIG.—4B
TYPE 3 FUEL
⊢50 μm⊣
BACK SCATTERED MICROGRAPHS
Pu X-RAY MAPS FIG.—5
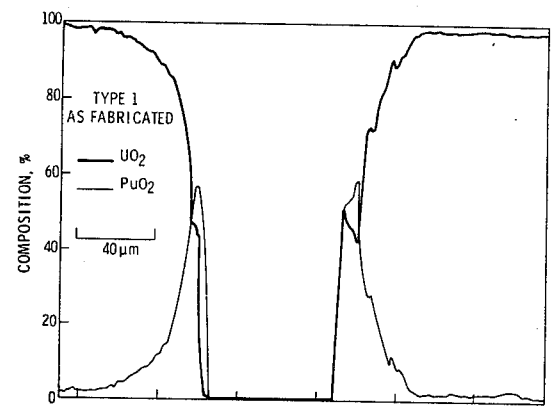
FIG.—6
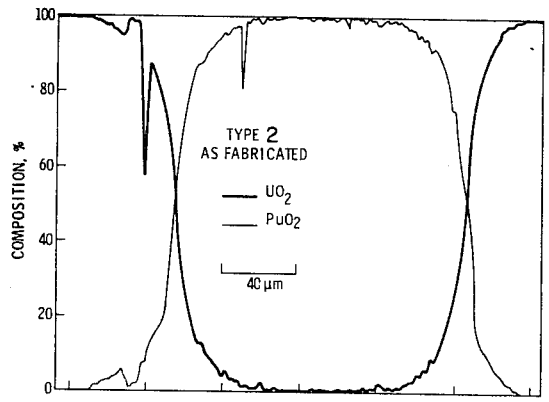
FIG.—7
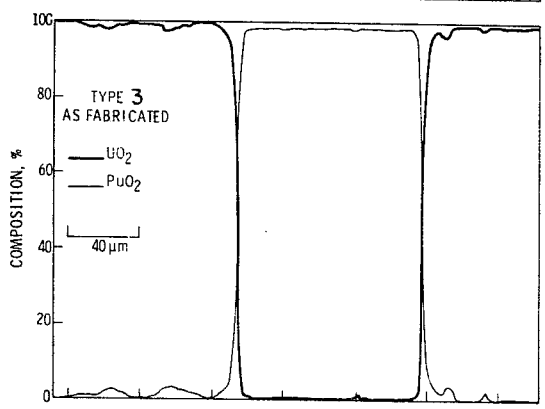

METHOD FOR HOMOGENIZING MIXED OXIDE NUCLEAR FUELS

This invention generally relates to nuclear reactor fuels and, more particularly, to mixed oxide fuels. These oxide fuels contain, inter alia, plutonia which is $PuO_2$ and urania which is $UO_2$.

One of the important problems in fabricating nuclear reactor mixed oxide fuels is obtaining homogeneity. In the case of mixed oxide fuels a non-homogeneous fuel mixture will cause hot spots. For example, if plutonia is not homogeneously mixed through the fuel, the fission events become localized in small areas. In addition, plutonia absorbs some of the neutrons through the phenomenon of self-shielding. If plutonia is not uniformly distributed through the fuel, then a non-uniform neutron density is produced. Furthermore, if large plutonia particles are present on the surface of the pellet, then these particles may react with the cladding under certain circumstances, causing deterioration of the mechanical properties of the cladding. Additionally, in nuclear fuel reprocessing a homogeneous fuel mixture is desired so that the plutonia will dissolve easily.

In the past, to obtain fuel homogeneity, commercial fuel manufacturers have introduced plutonia particles into mechanically blended fuels as particles less than 44 micrometers ($\mu m$) in size. These small particles may be obtained by ball milling. During the preparation of plutonia powder by ball milling the potential exists for large plutonia particles to end up in the fuel and the fuel to be nonhomogeneous. This can occur through particle agglomeration or through the inadvertent introduction of large, un-milled particles into the mixture.

Thus, there is a continuing search in the reactor fuel industry for techniques and processes to produce homogeneous fuels.

It is an object of the present invention to improve the homogeneity in mechanically blended nuclear reactor fuels. This object is achieved by sintering the fuel pellets in a hydrogen atmosphere and with a sufficiently low oxygen potential to reduce the $Pu^{+4}$ to $Pu^{+3}$. This reduction results in the formation of water vapor which builds up pressure within the plutonia particles and causes the plutonia to be extruded into the urania matrix.

It is an additional object of the present invention to ensure that large, discrete plutonia particles are not present in mixed oxide reactor fuels. The presence of these large particles can affect reactor operations in the following ways: the creation of local power spikes, degradation of the Doppler coefficient, change in fuel reactivity, and enhancement of cladding failure during reactivity insertion accidents.

These and other objects are achieved by a method of blending urania particles and plutonia particles together into a uniform mixture and pressing the mixture into a pellet. The pellet is thereafter sintered in a hydrogen atmosphere to reduce the plutonia.

Additional objects and features of the invention will appear from the following description in which the preferred embodiment has been set forth in detail in conjunction with the accompanying drawings.

FIG. 1 is an illustration of the steps in fabricating mixed oxide fuel pellets according to the present invention.

FIGS. 2A, 3A, and 4A are back scattered electron micrographs of type 1, 2, and 3 fuels, respectively, which were produced according to the present invention.

FIGS. 2B, 3B, and 4B are plutonium x-ray maps of the type 1, 2, and 3 fuels, respectively, which were produced according to the present invention.

FIGS. 5, 6, and 7 are electron microprobe scans of the plutonia zones in the type 1, 2, and 3 fuels, respectively.

FIG. 1 illustrates a flow sheet according to the present invention for manufacturing mixed oxide nuclear reactor fuels. Highly sinterable, natural urania ($UO_2$) powder 10 conforming to American Standard N5.5 for Nuclear Grade Dioxide, Sinterable is used. The $UO_2$ powder 10 is mixed in step 13 with $PuO_2$ powder 12. The $PuO_2$ is previously calcined to 950° C. to reduce the residual concentrations of carbon, chlorine and fluorine.

After the mixing, the powder goes through a granulation process during which the powder is subjected to a pre-slugging operation in step 14. This operation is performed because the particles in the powder are frequently too fine to press satisfactorily. The pre-slug pressing is performed at lower pressure than is ordinarily used during the final pressing operation.

After the pre-slug pressing in step 14, the pellets which are thus formed are broken down by crushing and are screened in step 16 through either a 40 or a 20 mesh screen. The preslug pressing in step 14 and screening in step 16 form powder granules that are relatively more free flowing and have a higher bulk density as compared to the original powders 10, 12. The resulting granules give a more reproducible and higher density die fill during the pressing operation in comparison to the as-milled powder, and result in more uniform pellet lengths and fewer pellet cracks because less air is trapped in the pellets during pressing.

After the screening operation in step 16, FIG. 1 powders are pressed in step 18 in a hydraulic press (not shown) of conventional construction. The powders are pressed to as high a green density as possible without introducing pressing defects such as capping. Green density is the geometric density of the pressed pellets before sintering. Typically the green densities are 45 to 60% of the theoretical density (hereinafter TD). After the pressing step 18, the pellets may undergo a de-binding operation in step 20 to remove the lubricant which is swabbed on the die walls prior to pellet pressing in step 20. This step is performed if the sintering furnace can not accommodate the lubricant reacting with the heating element or heat shields, or being deposited on the inside of the furnace walls. The de-binding operation consists of heating the pellets to a few hundred degrees centigrade so that the organic lubricant is driving out of the pellets.

In commercial practice lubricants, like stearic acid can be mixed with the powders following pre-slugging and screening to improve powder flow characteristics.

After de-binding, the pellets are sintered in step 22 in order to increase their density. Before sintering the pellets typically have densities of 45 to 60% TD. After final sintering, the densities of the pellets are between 91 and 95% TD.

In the embodiments described herein the pellets were sintered in a 63.5-mm-dia × 102-mm-tall molybdenum sintering crucible contained in a clamshell type, water-cooled refractory metal furnace. The sintering cycle was controlled using a curve-follower type programmer. For sintering runs at 1675° C. and higher, the furnace was heated at 200° C./hr to 1400° C., then at 100° C./hr to the desired soak temperature. For sintering runs at 1475° C. and 1500° C., the furnace was heated at 200° C./hr to 1200° C., then at 100° C./hr to the desired soak temperature. The cooling rate was 400° C./hr for all sintering runs.

According to the present invention a low oxygen, reducing atmosphere is formed in the sintering furnace during the sintering operation in step 22. The oxygen activity is controlled and improved fuel homogeneity is achieved by sintering in an inert gas atmosphere with hydrogen and with sufficiently low oxygen potential to reduce the $Pu^{+4}$ to $Pu^{+3}$. In the embodiments described herein the inert gas, argon, is mixed in step 24 with 8% hydrogen. This gas mixture is passed over titanium chips which are heated to 850° C. yielding an oxygen potential of approximately $-700$ kJ/mole. This is equivalent to a partial pressure of oxygen of $2 \times 10^{-33}$ atm. The titanium removes or getters the oxygen and water out of the gas stream in step 26 by forming $TiO_2$. The flow rate of the Ar-8%$H_2$ mixture into the sintering furnace is 3 ft$^3$/hr.

It should be understood that in commercial practice, oxygen levels may be significantly higher than this value; in fact, $H_2O$ may even be added to increase the oxygen level and to promote sintering, resulting in stoichiometries of 2.00 and no $Pu^{+4}$ reduction. In such cases, enhanced homogenization would not occur.

After sintering in step 22, the pellets are ground in step 40 to a uniform cylindrical diameter. After grinding the pellets are washed in step 42 in water or any other appropriate solvent to remove the grinding debris. After washing the pellets are inspected in step 44 for dimensional uniformity, cracks and chips, and density. Next the pellets may be outgassed in step 46 to remove the absorbed water. Outgassing is performed by subjecting the pellets to a temperature of 425° C. and a vacuum of $2 \times 10^{-4}$ torr for about 14 hours. The pellets are thereafter loaded into fuel pins in a carefully controlled atmosphere and the end caps of the fuel pins are welded in place to seal the pins and to ensure against contamination.

A further disclosure of the nature of the present invention is provided by the following specific examples of the practice of the invention. It should be understood that the data disclosed serve only as examples and are not intended to limit the scope of the invention.

To produce the type 1 and 2 fuels described herein, the above-described fabrication process was changed slightly. The urania powder 10, FIG. 1 was heat treated for two hours at 1300° C. in order to reduce its sinterability. Neither of the powders was milled. The type 1 fuel had a $PuO_2$ particle size of 60–100 μm and the type 2 $PuO_2$ particle size was between 300–500 μm.

To prepare the large $PuO_2$ particles to be added before step 13, the powder is first packed in a rubber liner (not shown) in a die and is isostatically pressed at 32 kgf/mm$^2$ (310 mpa). This pressing force produces a $PuO_2$ slug having a bulk density of about 50% TD. The slug is thereafter crushed until it will pass through a 20-mesh screen. The particles are then vibrated in a mixer-mill to produce well rounded particles which are then screened to obtain the necessary particle sizes. Resulting particles were screened to required size ranges.

For the type 2 fuel, the 300–500 μm $PuO_2$ particles were added following the screening step 16 in order to prevent damage to the $PuO_2$ particles during granulation of the pre-slugged material.

The type 1 fuel was sintered for 8 hours at a temperature of 1675° C. and had a final oxygen to metal ratio of 1.990. The type 2 fuel, having a $PuO_2$ particle size of 300–500 μm, was sintered for 8 hours at a temperature of 1675° C. and had a final oxygen to metal ratio of 1.994.

The type 3 fuel is a thermally unstable fuel containing $PuO_2$ particles having a particle size of 60–100 μm. The $PuO_2$ particles are produced in the same manner as the type 1 fuel described above and the $UO_2$ powder 10 was not calcined.

The type 3 fuel was sintered for one hour at 1475° C. to produce pellets with an oxygen to metal ratio of 2.00.

The Type 4 fuel was sintered at 1675° C. for 8 hours yielding an oxygen to metal ratio of 1.987.

Below is a table of the fabrication parameters and stoichiometry of the type 1, 2, 3, and 4 fuels.

TABLE 1

FABRICATION PARAMETERS AND STOICHIOMETRY OF TYPE 1, 2, 3 and 4 FUELS

| Type | $PuO_2$ Particle Size, μm | Sintering Condition Temp. °C. | Time hr. | Fuel Stoichiometry Oxygen to metal Ratio (O/M) |
|---|---|---|---|---|
| 1 | 60–100 | 1675 | 8 | 1.990 |
| 2 | 300–500 | 1675 | 8 | 1.994 |
| 3 | 60–100 | 1475 | 1 | 2.000 |
| 4 | 44 | 1675 | 8 | 1.987 |

When the pellets are sintered in the manner described above, the solid $PuO_2$ particles are transformed into spherical shells of dense $PuO_{2-x}$ that surround a central cavity or pore. These central cavities each have a dimension which approximates the original particle diameter and a thin lining of high-plutonia material.

In particular, the back scattered micrograph, FIG. 2A for the type 1 fuel and the Pu x-ray map, FIG. 2B, for the type 1 fuel reveal that fuel manufactured with 60–100 μm $PuO_2$ particles and sintered at 1675° C. for eight hours no longer contains solid $PuO_2$ particles. These particles were transformed into spherical shells of dense $PuO_{2-x}$ that surround a central cavity. The electron microprobe examination, FIG. 5, of the type 1 fuel showed maximum Pu concentrations in the annular plutonia-rich zones that varied from 40 to 100% with a steep concentration gradient extending for a short distance into the adjacent, continuous $UO_2$ phase.

Based on numerical integration of the Pu profiles, it is believed that the plutonia or $PuO_2$ contained within the concentration gradients originated from the $PuO_2$ particles in the as-fabricated fuel. As a consequence of the sintering process the plutonia has been transported into the $UO_2$ matrix and is more homogeneously distributed in the pellet than in fuels where this process has not occured.

In the type 4 fuel (not shown) central pores that are surrounded by plutonia-rich zones were also observed. This fuel contained plutonium particles that were less than 44 μm in size and was sintered at 1675° C. for eight hours. The size of the pores and the width of the plutonia-rich zones are commensurately smaller in this type of fuel as compared to the type 1 fuel.

After sintering the type 2 fuel, FIGS. 3A, 3B also contains discrete plutonia particles. However, it was observed that near the particle-$UO_2$ matrix interface a series of interconnecting pores exists which extends around the periphery of each particle. This porous ring is located within the plutonia particle. The plutonia concentration gradient across this outer zone is similar in shape to the gradients observed in the type 1 fuel; however, as shown in FIG. 6, the plutonia reaches 100% in the type 2 fuel particles. It is believed that the similarity in shape between the type 1 and 2 fuels indicates that the same transport mechanism operates in both fuels.

In contrast to the type 1 and 2 fuels, the type 3 fuel exhibited very little transport of the plutonia into the matrix as shown in FIGS. 4A, 4B and 7.

Based on the foregoing, the sintering process forms pores surrounded by the minor component of a two component oxide system which has been heated in an inert gas/8% hydrogen reducing atmosphere. It is believed that the formation of these pores in the fuel is dependent on the reduction of $Pu^{+4}$ to $Pu^{+3}$. The reduction of $Pu^{+4}$ to $Pu^{+3}$ occurs when the oxygen potential or oxygen partial pressure in the sintering furnace is low. The stoichiometry of the type 1 fuel corresponds to approximately 100% reduction of the $PU^{+4}$ to $Pu^{+3}$ and in the type 2 fuel it corresponds to about a 50% reduction of the $Pu^{+4}$ to $Pu^{+3}$. In the commercial fabrication of mixed oxide fuels for light water reactors, the oxygen potential during sintering is typically maintained at a level to preclude the reduction of the $Pu^{+4}$ to $Pu^{+3}$ and the accompanying formation of central pores.

It is believed that the formation of voids results from the accumulation of water vapor according to the following reaction:

$$2Pu^{+4} + H_2 + O^{-2} \rightarrow 2Pu^{+3} + H_2O$$

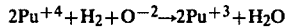

The water vapor accumulates within the plutonia particles. When the water vapor pressure reaches a sufficiently high value, the plutonia is extruded into the $UO_2$ matrix. The extrusion of the plutonia into the matrix results in an improvement in plutonia homogeneity because the plutonia is no longer contained in discrete particles.

Thus, although the best mode contemplated for carrying out the present invention has been herein shown and described, it will be apparent that variation may be made without departing from what is considered to be the subject matter of the invention.

What is claimed is:
1. A method for forming homogenized mixed oxide nuclear reactor fuels, comprising:
   (a) blending urania particles and plutonia particles together into a uniform mixture of plutonia in a urania matrix;
   (b) pressing the mixture into a pellet;
   (c) sintering the pellet in a furnace in a hydrogen atmosphere; and
   (d) reducing the plutonia in the pellet by said sintering, thereby forming pores in the pellet and homogenizing the fuel.

2. A method as in claim 1 including the step of maintaining the oxygen potential during sintering sufficiently low to cause the $Pu^{+4}$ to be reduced to $Pu^{+3}$.

3. A method as in claim 2 including the steps of:
   (a) reducing the plutonia with said hydrogen during sintering;
   (b) generating thereby pressurized water vapor in said urania matrix; and
   (c) extruding the plutonia into said urania matrix with the water vapor pressure.

4. A method as in claim 2 wherein said maintaining step includes removing sufficient oxygen from the atmosphere to achieve an oxygen potential in the furnace of less than about $-700$ kJ/mole.

5. A method for forming homogenized mixed oxide nuclear reactor fuels, comprising the steps of:
   (a) blending urania particles together into a uniform mixture of plutonia in a urania matrix;
   (b) pressing the mixture into a pellet;
   (c) sintering the pellet in a reducing atmosphere with hydrogen present and at a temperature in excess of 1475° C. for a time period in excess of 1 hour;
   (d) reducing the plutonia in the pellet by said sintering; and
   (e) forming pores in the urania matrix with walls of concentrated plutonia by said reducing step thereby homogenizing said fuel.

6. A method as in claim 5 wherein the reducing atmosphere during sintering includes an inert gas and about 8% hydrogen.

7. A method as in claim 5 including the steps of gettering a hydrogen gas mixture with titanium particles at elevated temperatures to provide an oxygen potential of less than approximately $-700$ kJ/mole, and supplying said gas mixture to said sintering step.

* * * * *